United States Patent
Bush

(12)
(10) Patent No.: US 6,246,400 B1
(45) Date of Patent: *Jun. 12, 2001

(54) DEVICE FOR CONTROLLING REMOTE INTERACTIVE RECEIVER

(76) Inventor: Thomas A. Bush, 100 First Stamford Pl., Suite 200, Stamford, CT (US) 06902-6732

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,630

(22) Filed: Dec. 2, 1997

Related U.S. Application Data

(63) Continuation of application No. 08/444,202, filed on May 18, 1995, now abandoned, which is a continuation-in-part of application No. 08/191,143, filed on Feb. 2, 1994, now Pat. No. 5,475,585, which is a continuation of application No. 07/591,380, filed on Oct. 1, 1990, now abandoned.

(51) Int. Cl.$^7$ .................................................. H04N 7/173
(52) U.S. Cl. .............................. 345/327; 348/12; 455/5.1
(58) Field of Search .................................. 348/12, 13, 6, 348/10, 11, 7, 1, 3; 455/5.1, 6.1, 6.2, 6.3, 4.2, 2, 734, 14, 15, 16, 17, 18; 380/5, 7, 15, 20; 345/327

(56) References Cited

U.S. PATENT DOCUMENTS

| | | | |
|---|---|---|---|
| 4,071,697 | 1/1978 | Bushnell et al. | 179/2 |
| 4,358,672 | 11/1982 | Hyatt et al. | 235/380 |
| 4,734,858 | 3/1988 | Schlafly | 348/13 |
| 4,907,257 | 3/1990 | Asano et al. | 379/144 |
| 5,046,093 | 9/1991 | Wachob | 341/176 |
| 5,138,649 | 8/1992 | Krisbergh et al. | 379/56 |
| 5,173,589 | 12/1992 | Diehl et al. | 235/375 |
| 5,173,936 | 12/1992 | Ditzig et al. | 379/440 |
| 5,208,446 | 5/1993 | Martinez | 235/380 |
| 5,266,782 | 11/1993 | Alanara et al. | 235/380 |
| 5,282,028 | 1/1994 | Johnson et al. | 348/12 |
| 5,311,302 | 5/1994 | Berry et al. | 348/14 |
| 5,336,870 | 8/1994 | Hughes et al. | 235/379 |
| 5,343,239 | 8/1994 | Lappington et al. | 348/13 |
| 5,388,101 | 2/1995 | Dinkins | 348/13 |
| 5,410,326 | 4/1995 | Goldstein | 348/134 |
| 5,421,030 | 5/1995 | Baran | 348/10 |
| 5,451,998 | 9/1995 | Hamrick | 348/13 |
| 5,521,631 | 5/1996 | Budow et al. | 348/3 |
| 5,671,267 | * 9/1997 | August et al. | 348/10 |

FOREIGN PATENT DOCUMENTS

WO 9306564  4/1993  (WO) .

* cited by examiner

*Primary Examiner*—Chris Grant
(74) *Attorney, Agent, or Firm*—Sofer & Haroun, LLP

(57) ABSTRACT

A remote control device controls interaction of an interactive receiver unit positioned at a remote location. The remote control device has a housing and manually actuable keypad mounted on the housing. A control mechanism is mounted in the enclosure and operatively connected to the manually actuable keypad for receiving selected input data from the keypad corresponding to desired programming selections of the interactive receiver unit positioned at the remote location. Financial information is stored in the remote, and a transmitter transmits a desired program corresponding to a selected keypad sequence, and also transmits financial information of the user.

54 Claims, 13 Drawing Sheets

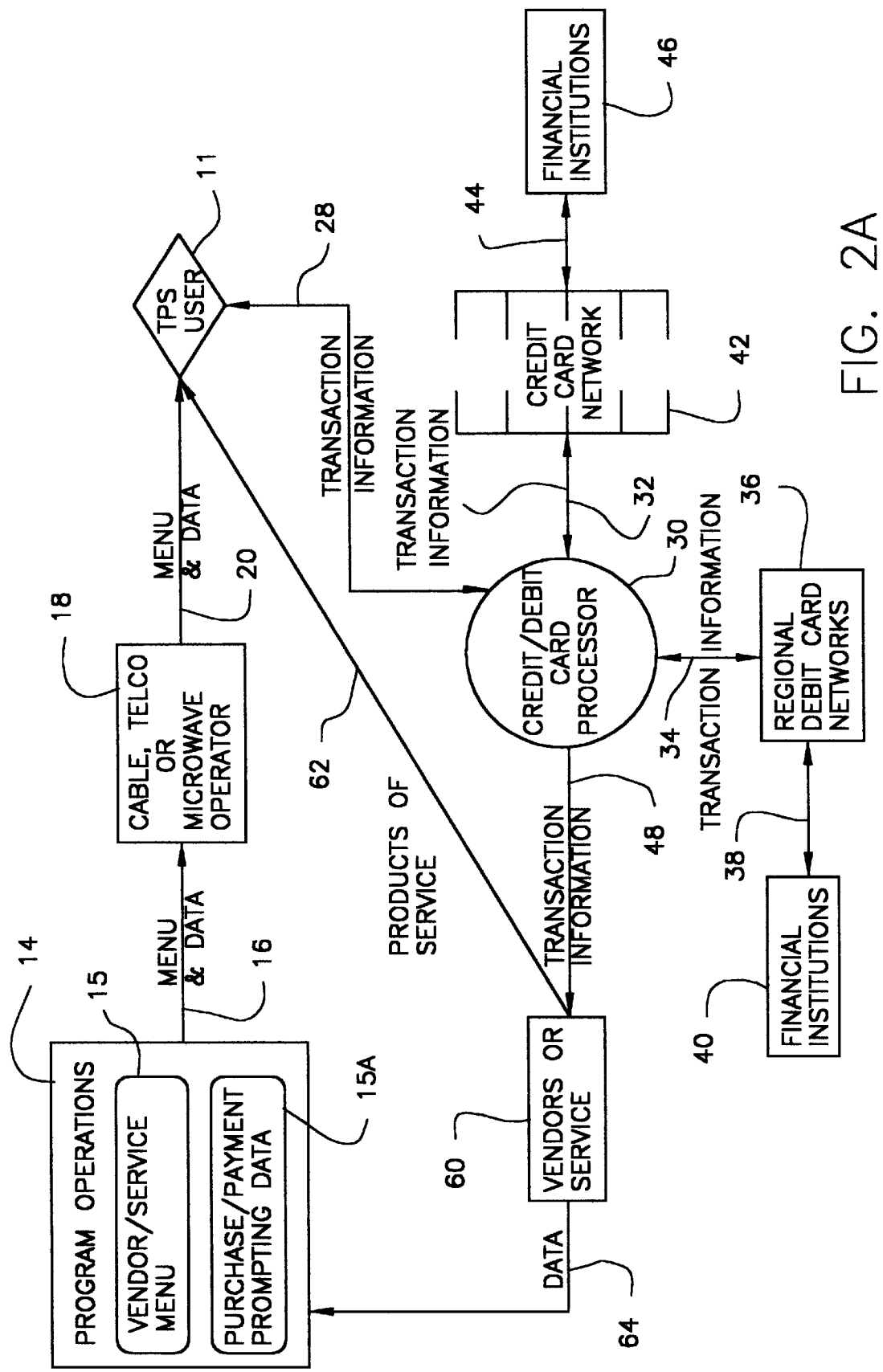

DEVICE FOR CONTROLLING REMOTE INTERACTIVE RECEIVER

This is a continuation of application Ser. No. 08/444,202 filed May 18, 1995 now abandoned which is a continuation-in-part application of U.S. patent application Ser. No. 08/191,143 filed Feb. 2, 1994, now U.S. Pat. No. 5,475,585 which is a continuation of application Ser. No. 07/591,380, filed Oct. 1, 1990, now abandoned, which are hereby incorporated by reference in their entirety into the present application.

FIELD OF THE INVENTION

This invention relates to a device for controlling a remote interactive receiver unit and, more particularly, to a remote control device which transmits user financial information or programming information to an interactive receiver unit positioned at a remote location.

BACKGROUND OF THE INVENTION

In the copending parent application, a transactional processing system is disclosed for purchasing products and services from a plurality of available products and services, and for processing corresponding financial transactions in real time. A transmitter broadcasts and updates a plurality of transaction information sets associated with a plurality of available products and services via a first communication channel. This first communication channel has a plurality of subchannels, each corresponding to a transaction information set in the first channel.

A plurality of receiver units, e.g., receivers positioned in difference households, serve a respective plurality of users, and simultaneously receive the identical transaction information sets broadcast from the transmitter. Each receiver unit includes a user interactive mechanism for selecting and storing a desired information set and for selecting a desired transaction for purchasing a product and services associated with a selected set.

A second communication channel originates at the receiver units and financial information of a respective user is transmitted from a receiver unit through the channel to a transaction processor, which receives the financial information of respective users. The transaction processor generates an authorization signal through the second communication channel to respective receivers to authorize a desired transaction in a real time for the selected products and services. The receiver unit could be incorporated within a television set.

In one aspect of the disclosed invention in the copending parent application, the receiver unit is a tabletop unit having a credit card slot for receiving a card and recording financial information of the user. The receiver unit also includes a keypad and other switches and functions for controlling television station selections. The receiver unit could also include phone components and be formed as a phone handset.

The use of remote devices for controlling television, video recorders/players, and other devices, however, is becoming more commonplace, and in some instances, required. Accordingly, it is desirable if the receiver unit of the transactional processing system could be controlled from a remote control device, and more preferably, a handheld remote control device. A remote control device should not only control processing instructions at the receiver unit, but also receive financial information of a user, such as by a smart card or credit card. Additionally, it is desirable to have a remote control device which can control operation of a receiver unit positioned at a remote location in which the remote control device not only transmits desired programming selections, but also receives and transmits to the receiver unit financial information of a user for further transactions by the receiver unit.

SUMMARY OF THE INVENTION

The present invention now allows transmission from a remote control device of desired programming selections to a receiver unit positioned at a remote location so as to choose a desired programming instruction set and interact therewith through a manually actuable keypad. The remote control device also transmits financial information of the user to the receiver unit. The receiver unit selects, stores and displays on a screen, such as television, the desired information set from these sets that are simultaneously received in the receiver unit.

A housing forms an enclosure and has a manually actuable keypad mounted on the housing. A processor is mounted in the enclosure and operatively connected to the manually actuable keypad for receiving data input from the keypad corresponding to desired programming selections at the remote receiver unit. The remote control device also stores financial information of the user. A transmitter is operatively connected to the processor for transmitting the desired programming selections to the receiver unit corresponding to the selected keypad sequence so as to choose a desired programming and interact therewith. The remote control device also transmits financial information of the user to the receiver unit.

In one aspect of the invention, the remote control device comprises the handset of the phone. Phone numbers are dialed from the keypad, and phone data is transmitted and received to and from a phone receiver unit positioned at the receiver unit. The phone receiver unit is connected to the local office. The phone receiver unit also may be an integral part of the receiver unit.

The remote control device also includes a switch for switching between use as a phone handset and use as a controller which interacts with the receiver unit. The remote control device in another aspect of the invention includes a switch for selecting between use as a controller for keypad selection of television channels and keypad selection of subchannels of the transaction information sets. Financial information can be input by wiping a card containing the financial information of the user within a slot positioned on the remote control device housing. The slot can include a magnetic-strip/IC reader. In still another aspect of the invention, the keypad is a qwerty keypad.

BRIEF DESCRIPTION OF THE DRAWINGS

The foregoing advantages of the present invention will be appreciated more fully from the following description, with reference to the accompanying drawings, in which:

FIG. 2A is a block diagram of the Transactional Processing System (TPS);

DETAILED DESCRIPTION OF THE INVENTION

Figure 1:
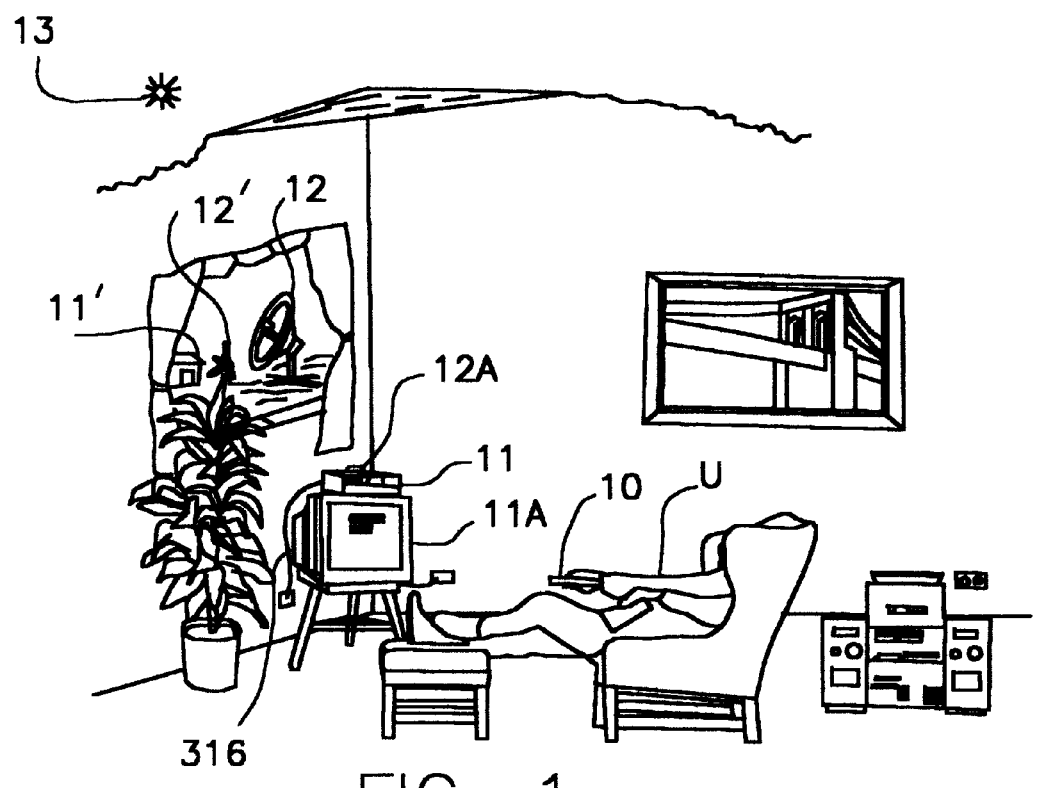
FIG. 1 is an environmental view of the inside of a home showing a user having the remote control device of the present invention and using the device to interact with the transactional processing system receiver unit.

Referring now to the drawings in which like numeral represent like components, FIG. 1 illustrates an environmental view of the inside a house showing a user "U" having the remote control device 10 of the present invention using it in conjunction with the receiver unit 11 of the transactional processing system. As illustrated, the receiver unit 11 receives signals from a satellite dish 12, and satellite 13 uplink via cable 12a. Another receiver 11' is a part of the system and receives signals simultaneously from its satellite dish 12' and uplink connection. In these illustrated embodiments, the receiver unit 11 is connected to a television 11a which displays selected transactions sets.

FIG. 2A illustrates block diagram of Transactional Processing System (TPS). Many details of the Transaction Processing System are set forth in the copending parent application which is incorporated by reference in its entirety into the present application. For purposes of understanding, a general description of the Transaction Processing System is set forth below.

A transmitting source 14 broadcasts a signal, preferably video, representing one or many video menus, offering the consumer the option to pay for either a product or a service. The menu information 15 contains the picture of graphic information corresponding to vendors and services available in the system. The menu information could be broadcasted through a transmission channel 16 to a receiver 18 typically operated by a cable, telephone company, microwave TVRO or DBS operator. In a preferred embodiment described herein, cable operator 18 would in turn transmit information to receiver units 11 within its broadcast area, through transmission channel 20. Transmission channel 16 can be a full video channel or a narrow band channel through a satellite uplink-downlink.

The menu information 15 could be an aggregate of many pictures corresponding to various products or services combined into one full video signal and demodulated into narrow band information, whereby the TPS receiver would allow the customer to choose from many different menus without the cable operator 18 giving up a wide band or prime video channel.

In addition to menu information 15, the transmitting source 14, would also broadcast prompting data 15A, which represent the necessary information to electronically prompt a subscriber through the process of purchasing an item via a mail order catalog or paying for a selected service. Once the vendor or service is selected the prompting data for each vendor or service would be downloaded into a RAM within the receiver unit 11. The prompting information for each vendor or service could then be displayed on an LCD within the receiver unit 11 or in a television set connected to the receiver unit 11. It is also possible to combine both the picture and prompting data information and transmit the combination to receiver unit 11.

The user at the receiver unit 11, makes a menu selection and answers the questions or prompts, pertinent to the selected vendor or service. The user then wipes a credit/debit card through the receiver unit 11 which allows the credit/debit card to be authorized and purchase or payment be made. The card information would be transmitted from receiver unit 11 to transaction processor 30 via transmission channel 28. Typical receiver unit 11 would transmit the user selection and the financial account information via a modem, through a telephone line to transaction processor 30. The transaction processor 30 would then verify the user's financial account. This includes verifying whether the consumer does in fact have the requisite sum available in the chosen account to pay for the selection made.

In the event that the consumer has used a credit card, the transaction processor 30 would then forward the verified information to regional credit card network 42, through transmission channel 32. This information would be then forwarded to a participating financial institution 46, through transmission channel 44. The financial institution 46 would in turn pay the vendor or service provider 60, and the consumer would receive a bill or receipt for that particular transaction. Similarly, in the event that the consumer has used a debit card, the transaction processor 30, would then forward the verified information to a regional debit card network 36, through transmission channel 34. This information would be then forwarded to a participating financial institution 40, through transmission channel 38.

The transaction information would be also transmitted from transaction processor 30 to vendor or service provider 60, via transmission channel 48. Vendor or service provider 60 would then in turn provide the service or the goods purchased to the user vias appropriate channels. Vendor or Service provider 60 could also send purchasing data to transmitting source 14 via transmitting channel 64 for upgrading service and product information, product availability, price change, products purchased, and various other information.

There are various scenarios in which transaction information could be verified. For example, in order for the consumer to be assured that the selected product or service can be delivered on specific desired terms, the transaction processor 30 would cross check the transaction information transmitted through channel 28 with the corresponding vendor or service database. Once that transaction has been cross-checked, the credit card processor 30 would send the authorization signal.

Alternatively, the vendor/service provider 60 may update its corresponding database and transmit such updated information to transmitting source 14. Transmitting source 14 would then change the menu 15 and prompting data 15a and continuously broadcast the updated information to receiver units 11. Actual cross-check before authorization could be made lo ally in receiver unit 11. Hence customer's selection would be compared with updated information broadcasted to receiver 11 for product verification purposes.

Figure 2B:
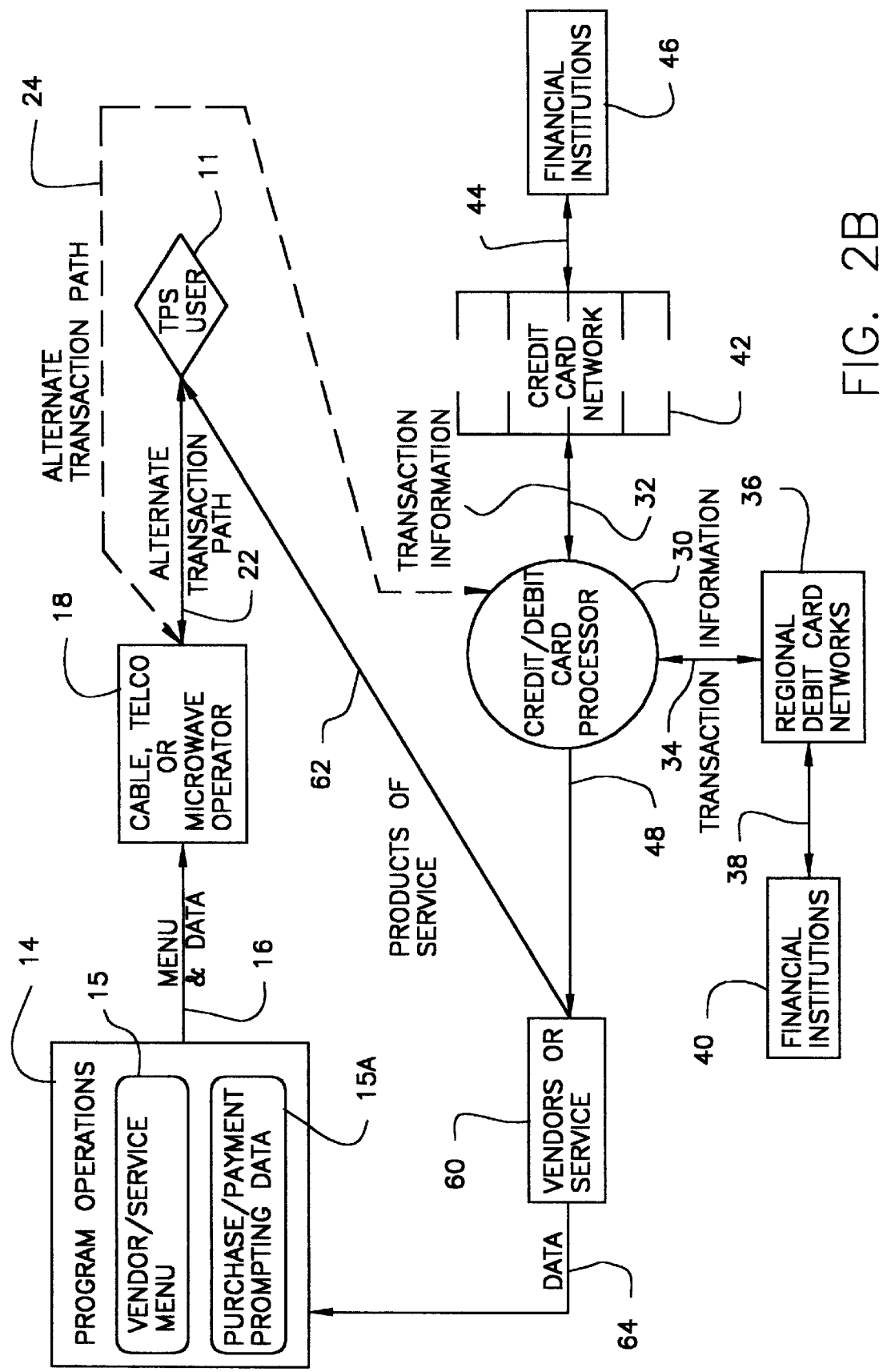
FIG. 2B is a block diagram of an alternate embodiment of the Transactional Processing System.

FIG. 2B depicts an alternate communication path for transaction authorization. When cable operator 18 requires to monitor all transaction interactions the consumer through the receiver unit 11 would make a selection. The information representing such selected service or product would be transmitted to cable operator 18 via transmission channel 22. Cable operator 18 after receiving the transaction information would retransmit such information to transaction processor 30 via transmission channel 24. Thereafter the transaction verification would proceed as discussed before.

There are, however, situations when up to the minute information is critical to the consumer and the retailer. A typical scenario is providing a limited product or service to a pool of consumers. This includes tickets for a performance of a sporting event. Since the available seats are very limited, it would become impractical to update the database by service provider 60, transmit that database to source 14, and retransmit that information to receiver unit 11 for verification purposes.

Figure 3:
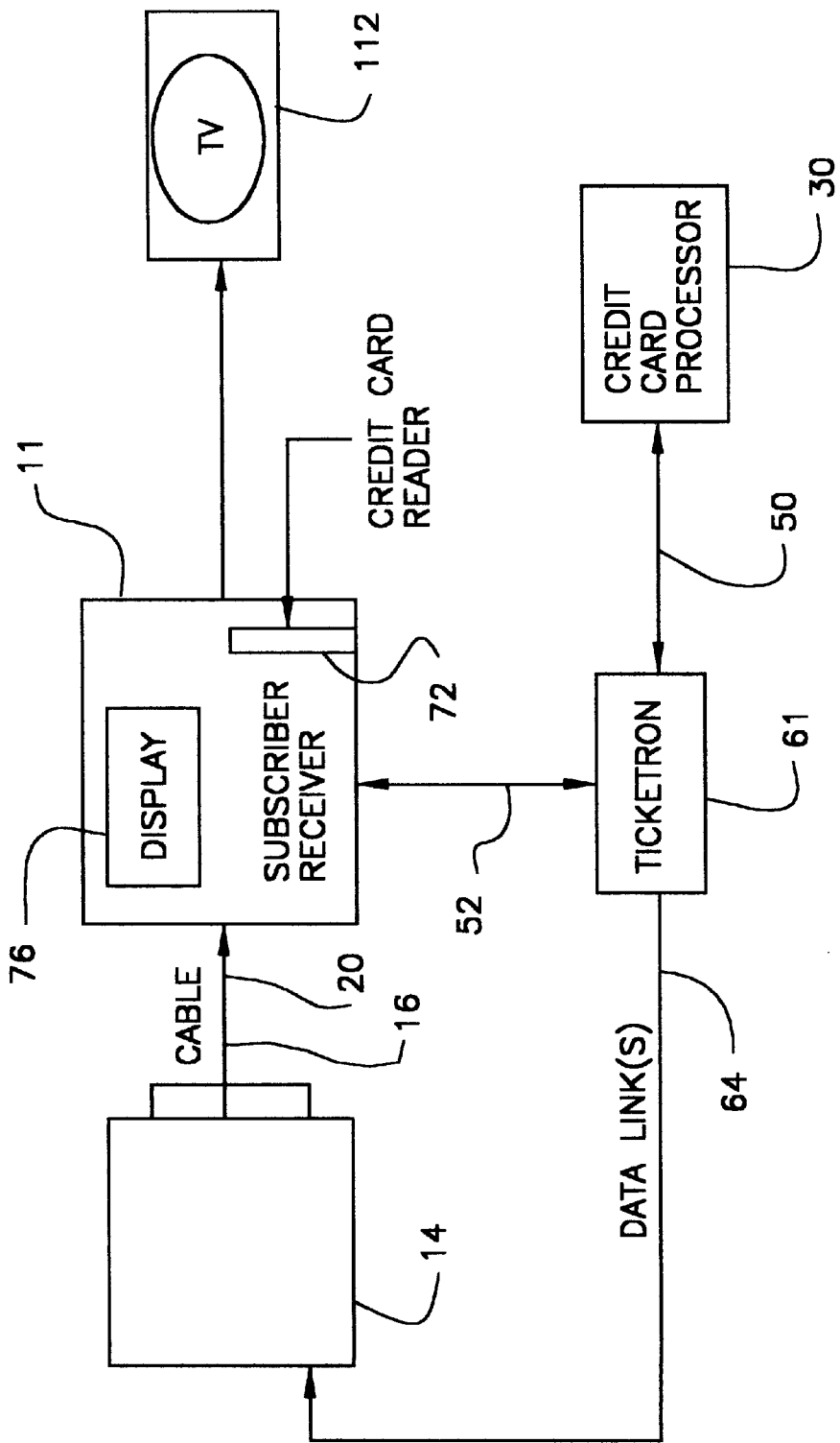
FIG. 3 is a block diagram of a TPS for real-time service requiring continuous update.

An alternate communication path as depicted in FIG. 3 could thus be established, where TPS user through a series of prompts would select the desired event. The information representing the user's choice would be transmitted to a ticket provider 61 like Ticketron, via transmission channel 52. The ticket provider 61 contains a database wherein available seats are continuously updated and the desired selection would be cross-checked against that database. If desired seat is available, the ticket provider 61 would transmit the transaction information to transaction processor 30 via transmission channel 50 for credit authorization. Once the credit is authorized as described hereinabove, the credit processor would transmit the verification signal to ticket provider 61, wherein the database contained therein would be updated and a confirmation message would be transmitted to the receiver unit 11 via transmission channel 52. The ticket provider 61 would transmit updated even availability and other pertinent information to source 14 through transmission channel 64.

Figure 4:
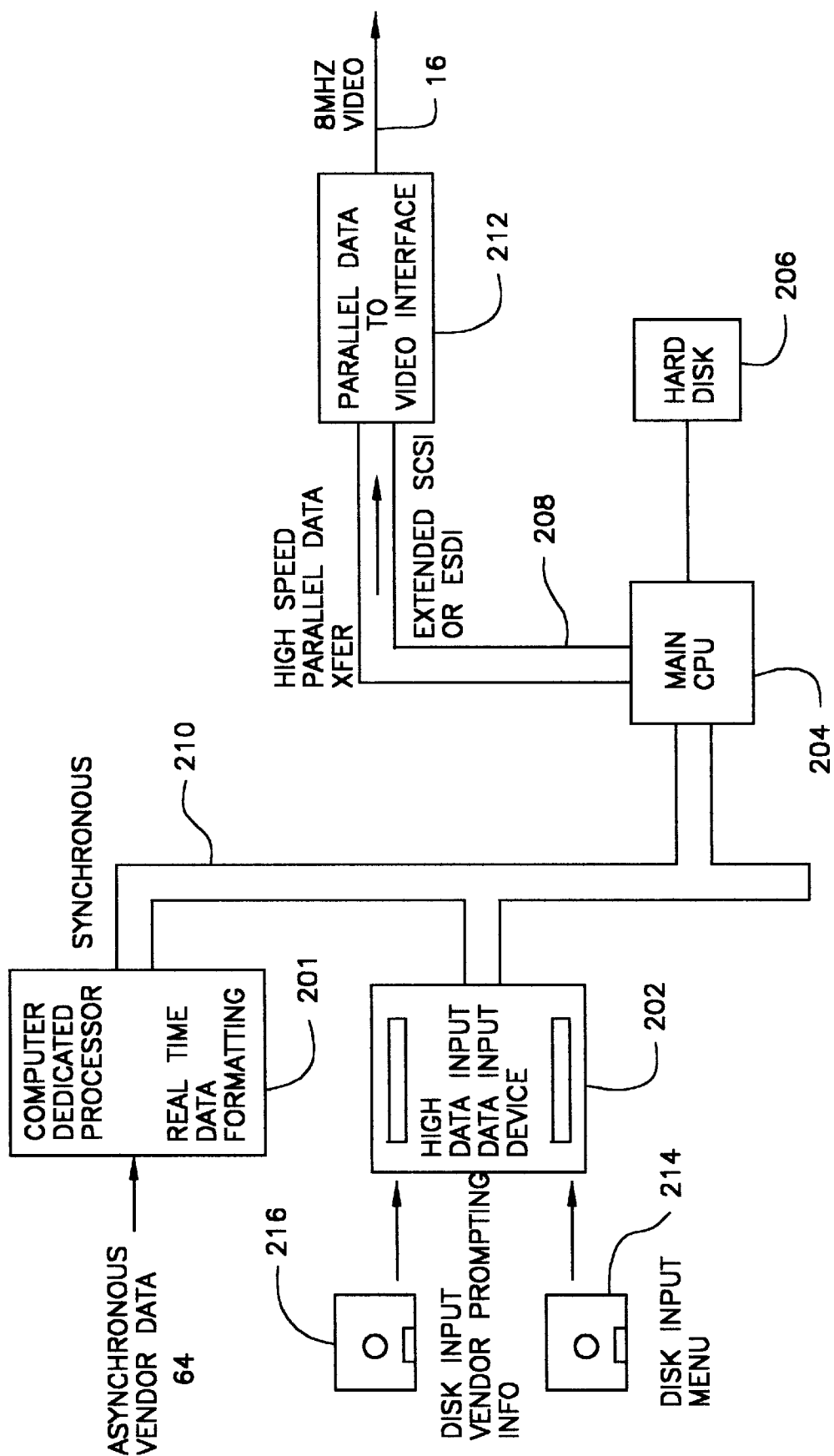
FIG. 4 is a block diagram of a TPS transmission system.

FIG. 4 shows the block diagram of transmitting source 14, wherein all the pertinent information for system's operation is programmed and accordingly transmitted to receiver units 11. Vendor or service provider's data can be transferred to the transmitting source 14, either through asynchronous communication or by hard copy data like computer disk storage. In FIG. 4, the high capacity data input device 202, has the ability to load menu (picture or graphics) and prompting data information via external disk storage devices 214 and 216.

Alternatively, both the video and prompting information could be combined and fed into the data input device 202 together. Various vendors who do not maintain an in-house database, could periodically update their product information and send the updated information to TPS programmer, in the form of computer disks 214 and 216. That information would be then transferred to the Main CPU 204, which controls the overall data formatting, and transmits the formatted data to parallel data to video interface 212.

In situations where the vendor or the service provider maintains a database for updating the product information, transmitting source 14 would be connected to that database via communications channel 64. The high speed vendors' or service providers' data would then be transmitted asynchronously from corresponding databases to computer dedicated processor 201. That information would be buffered within processor 201. The processor 201 would then perform packet formatting and output this data in a synchronous manner that is polled by the main DPU 204.

The main CPU 204, would perform time multiplexing to gather data belonging to various vendors and service providers. The data along with the formatted menu, prompting data and other housekeeping information will be time multiplexed and assembled by the main CPU 204 for transmission over the parallel bus to the parallel data to video interface 212. The video interface 212, converts the digital data into video format for transmission to receiver units 11. In the embodiment mentioned herein, video interface 212, is model 17480, by Quantel.

Hard disk 206 stores all the necessary information for the transmitting source 14. Data from main CPU 204 to video interface 212, is transmitted via an extended SCSI or ESDI, as commonly known in the art. Further information of the Transaction Processing Information of the present invention can be obtained from the incorporated parent application.

Figure 5:
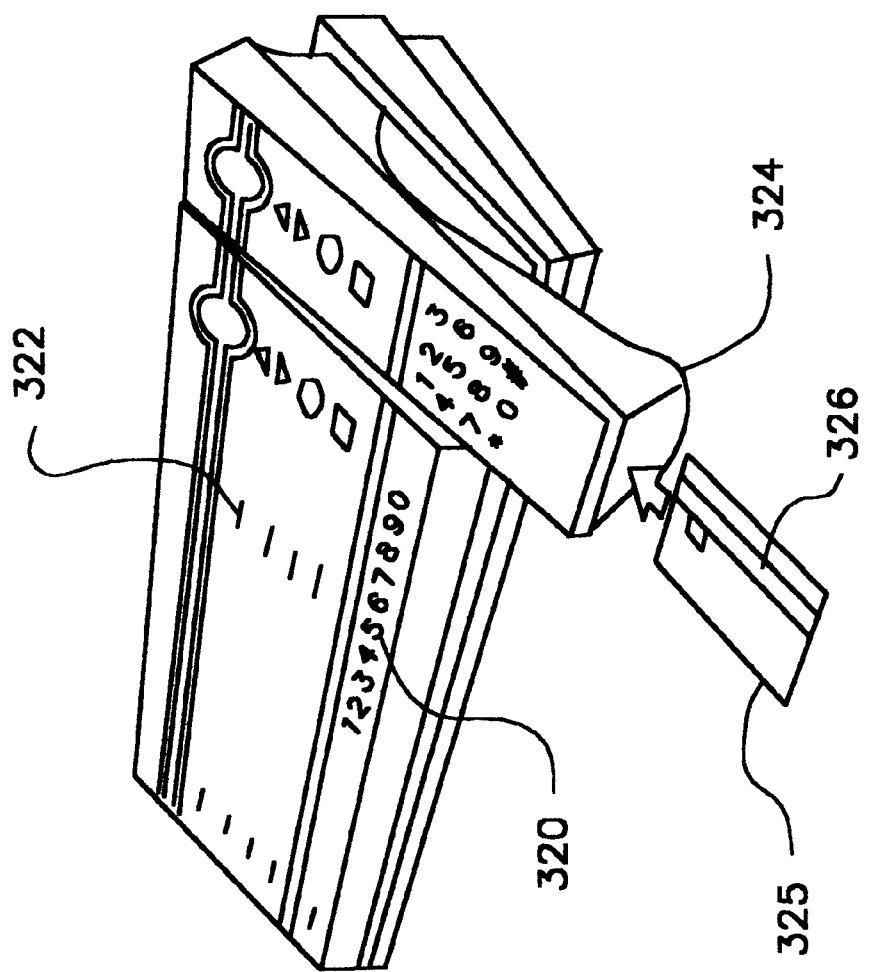
FIG. 5 is an isometric view of a Transactional Processing System receiver unit having a handheld remote control device in the form of a phone handset where a credit card is longitudinally inserted in its lower portion.

Referring now to FIGS. 5 through 11, there are illustrated various alternate embodiments of a remote control device which is associated for use with the receiver unit 11 of the Transaction Processing System. For purposes of understanding each alternate embodiment of the remote control device is indicated by a reference number beginning in the 300 series. Those components that are common to the different embodiments are given similar reference numerals. In FIG. 5, there is illustrated a receiver unit 11 which has a remote control device 300 associated therewith. The remote control device 300 is configured similar to a phone handset and is received within an end slot 302 of the receiver unit 11. The remote control device 300 includes phone circuitry (FIG. 12) which includes a microphone 306, receiver 308 and associated components 310 for receiving and transmitting phone messages to and from the receiver unit 11. The phone preferably has wireless connection to the receiver unit 11, and can use the transmitter 314 of the remote 300 for communication. The transmitter operates on several frequencies and transmits financial information on a communication channel different form the communication channel used to transmit desired programming selections. Transmitter 314 can include an interface 314a for interacting with a videogame.

The receiver unit 11 is operatively connected to the phone line 316 which connects to the central office (as shown in FIG. 1). As noted above, the phone line connected to the receiver unit forms a part of the second communication channel (FIG. 1).

The receiver unit 11 includes all the standard controls such as a numeric keypad 320, and a selector 322 for activating a scrolling function within the receiver unit 11. Other function keys may indicate power, tv/vcr, channel selector and volume controls. It is advantageous for any controls and function keys that are included on the remote control device to be duplicated on the receiver unit 11 in case the remote control device 300 is lost, misplaced or broken. The receiver unit 11 also can include a slot (not shown) for accepting a smartcard or credit card to obtain and store financial information of the user.

As shown in FIG. 5, the remote control device 300 also includes a slot 324 at the bottom portion of the handset adjacent to the speaker microphone. A credit card or smart card 325 is inserted longitudinally into the slot 324. The slot 324 typically is a magnetic-strip/IC reader, which reads the financial information contained on the magnetic strip 326 of the card.

As discussed above, FIG. 12 illustrates a high level block diagram of a remote control device 300 of the present invention, and shows various components of the device. The various switching mechanisms, functions, keypad and circuiting components can be selected by one skilled in the art. The remote control device 300 of the present invention also includes a switch mechanism 310a for switching between use of the remote control device as a phone handset and use as a controller for interaction with the receiver unit 11. Additionally, the remote control device includes a switching mechanism 327 for switching between use as a remote control device which selects television or cable channels and keypad selection of subchannels of the transaction information sets controlled by the receiver unit 11.

The remote control device 300 includes an eight bit microprocessor 330 which includes permanent firmware for operating some of the other components of the device. Additionally, the device 300 includes a battery 332, a lamp 334 for illuminating an LCD display and other controls and functions. A crystal oscillator 336 ensures frequency control. The keypad 320 is operatively connected to the microprocessor 330. The remote control device also includes a long term storage 338, such as an EEPROM, which stores financial information of the user for subsequent transactions, hours, days, or months in advance.

Figure 6:
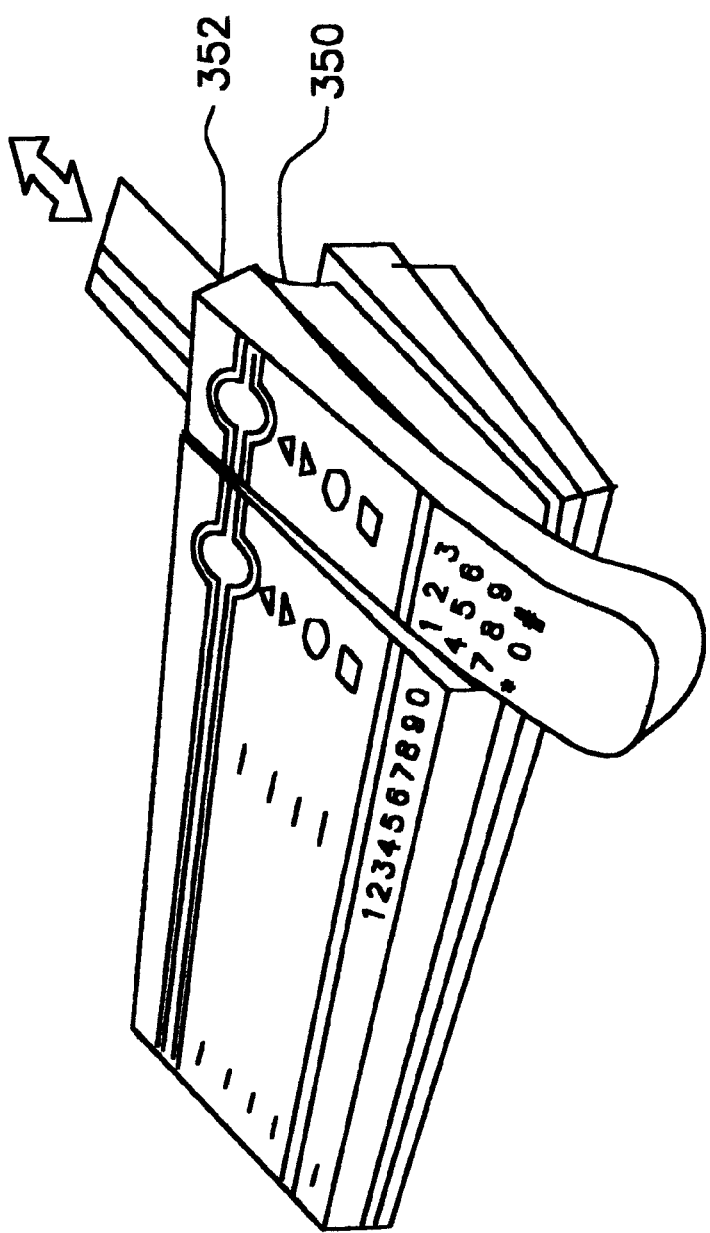
FIG. 6 is an alternate embodiment of the receiver unit of FIG. 5 showing a difference phone handset.

FIG. 6 illustrates an embodiment of a remote control device 350 of the present invention similar to that shown in FIG. 5. The card containing financial information is inserted longitudinally in a slot 352 positioned at the top portion of the handset adjacent the receiver.

Figure 7:
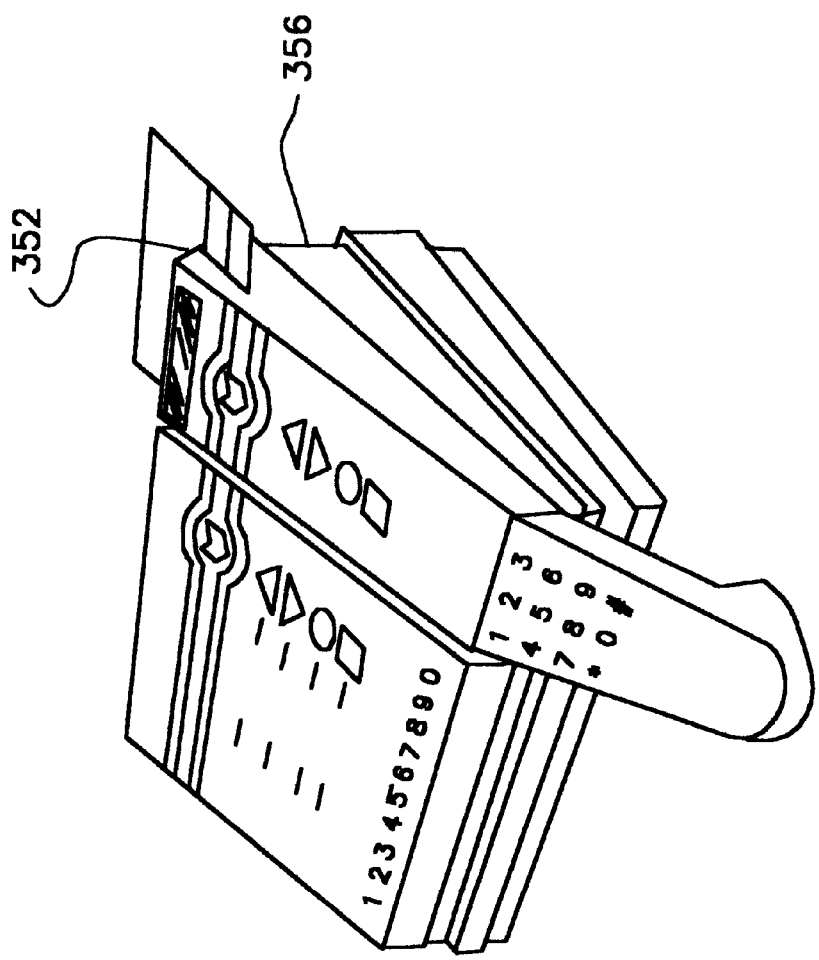
FIG. 7 is still another alternate embodiment of the receiver unit of FIG. 6 showing a different phone handset.
Figure 8:
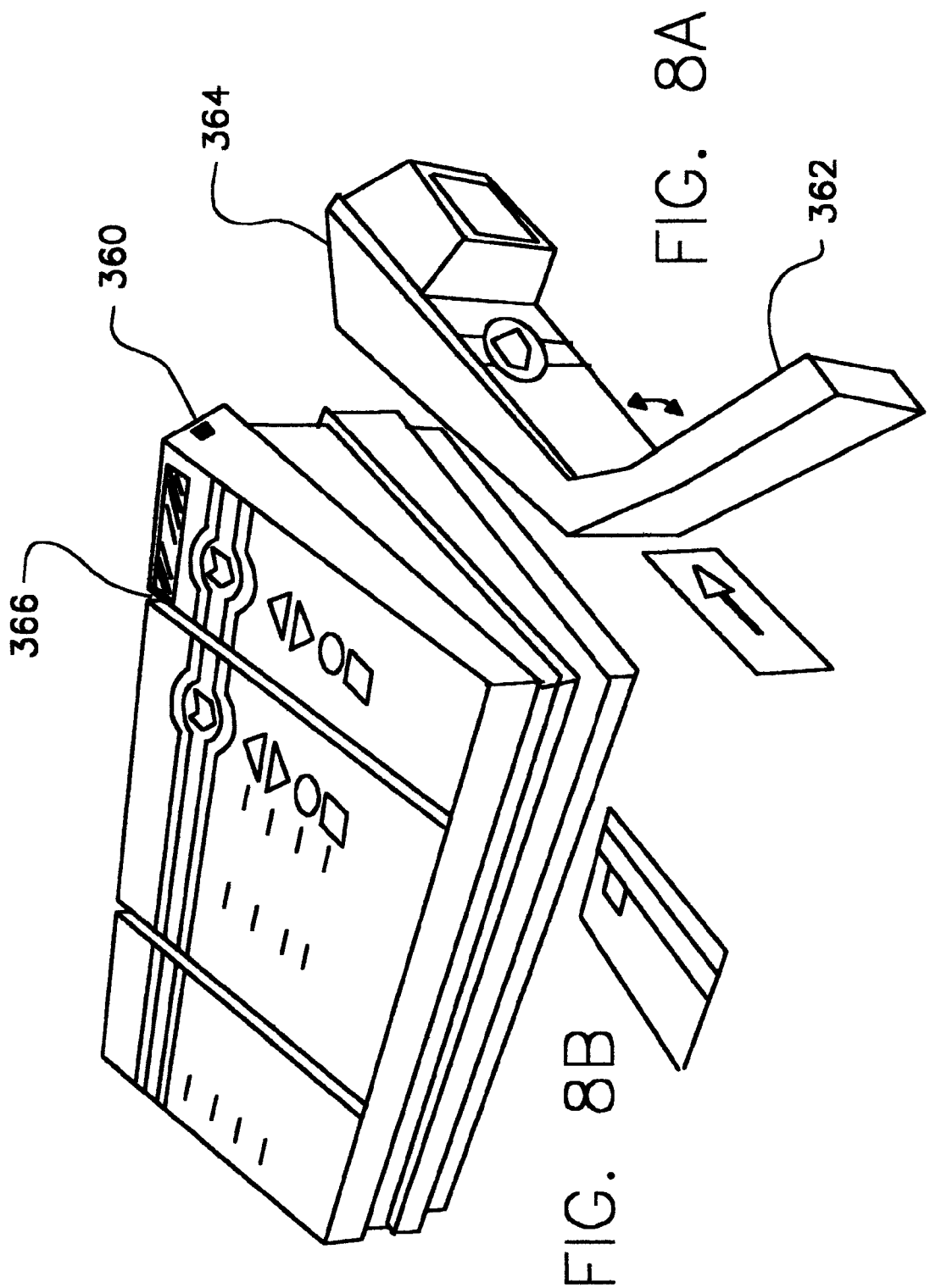
FIGS. 8a, b is an isometric view of an alternate embodiment of the receiver unit.

FIG. 7 still shows another embodiment of a remote control device 356 of the present invention where the card is inserted horizontally in the top slot 352.

The embodiments of FIGS. 5, 6 and 7 could be used with conventional games.

FIG. 8a discloses another embodiment of a remote control device, indicated generally at 360, of the parent invention where the speaker microphone assembly 362, which includes some control functions, is pivotally attached to the main body 364 of the remote control device. FIG. 8B shows the remote control device 360 resting in the slot 366 of the receiver unit 322.

Figure 9:
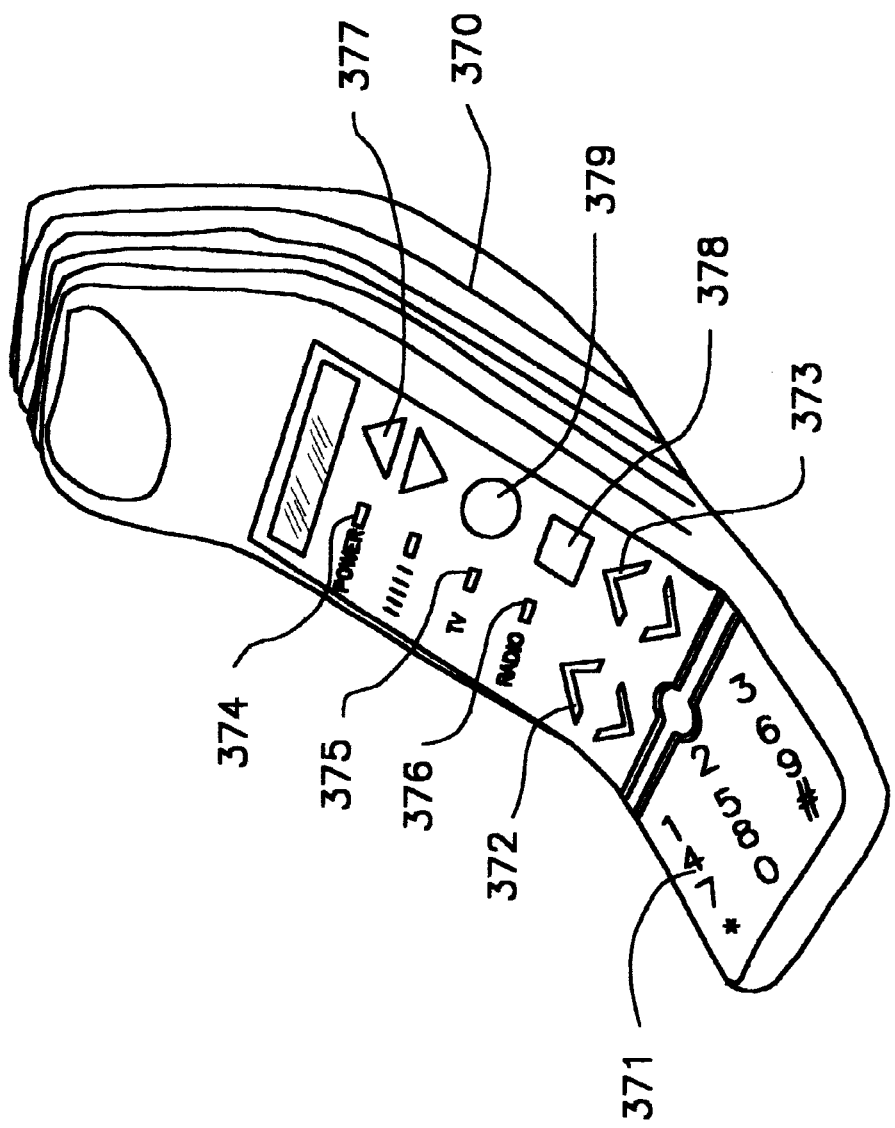
FIG. 9 is an alternate embodiment of the remote control device.

FIG. 9 is another embodiment of the remote control device 370 of the present invention in which more numerous control functions are mounted on the device. These functions can include a keypad 371, volume control 372, channel selection 373, power off/on 374, TV and radio selector 375, 376, scroll 377, and switches 378, 379 for selecting between phone operation and interactive communication with a receiver unit 11.

Figure 10:
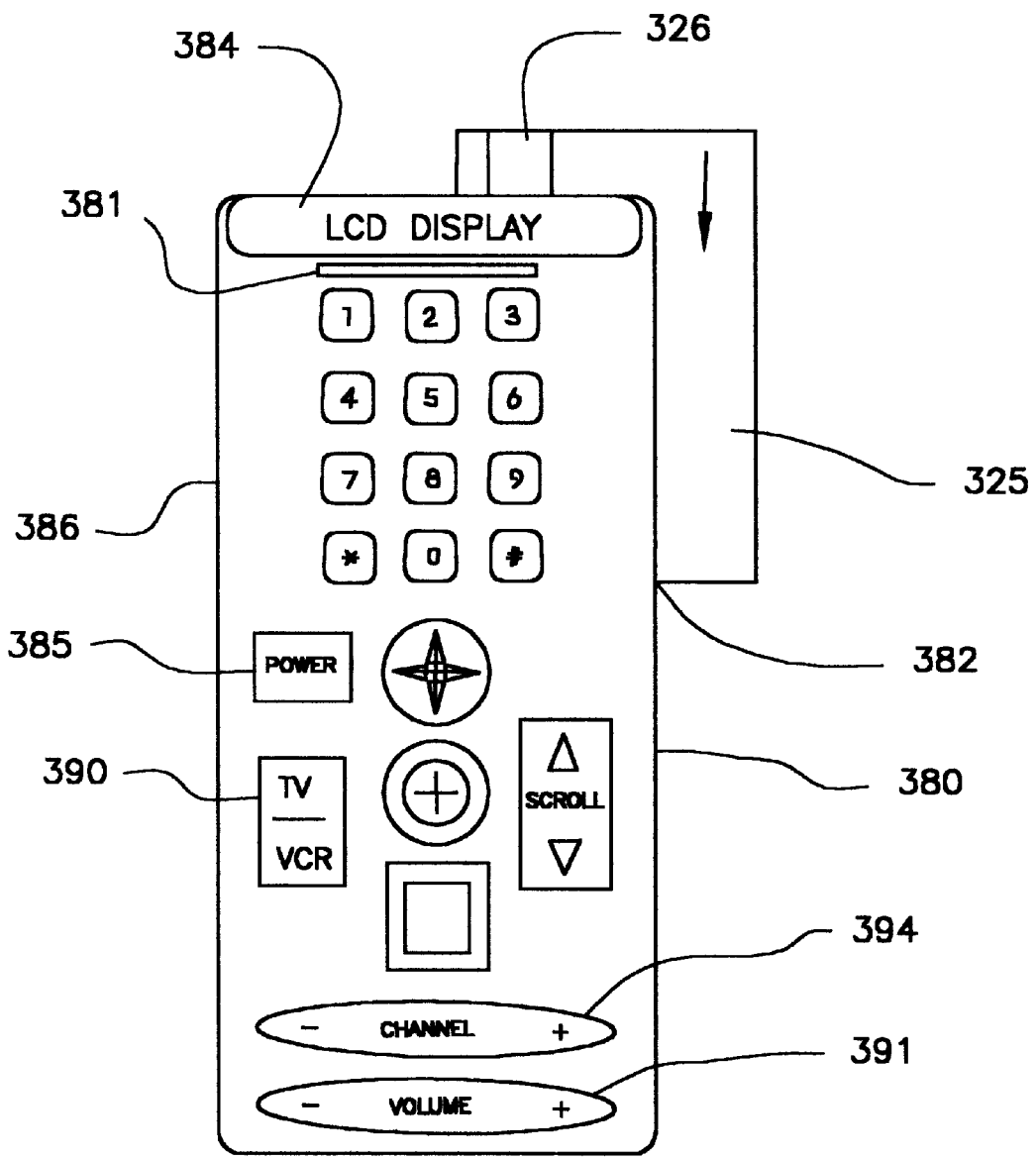
FIG. 10 is an alternate embodiment of the remote control device which has no phone components.

Referring now to FIG. 10, a more compact remote control device 380 which does not include phone components is illustrated. The device includes a slot 382 for receiving a credit card or other card containing financial information of the user as well as a small LCD display 384. A numeric keypad 386 for controls either selection of television channels or various transaction processing sets depending on the position of the selector switch 387. Additionally, the device includes a power switch 385, and a TV/VCR button 390. The device also includes standard channel and volume buttons 394, 391. Other controls will be included desired.

Figure 11:
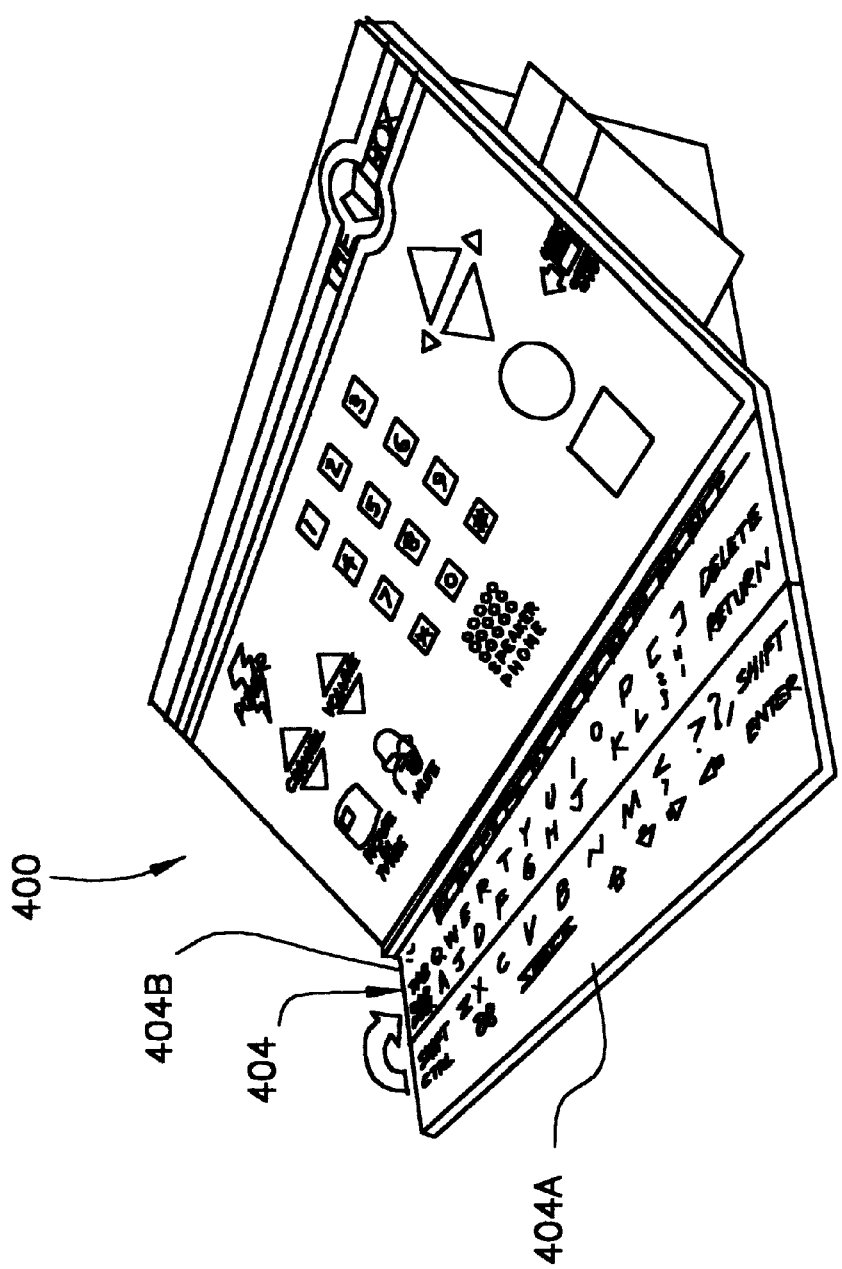
FIG. 11 is an alternate embodiment of the remote control device showing a more complex remote control device having a querty keyboard.
Figure 12:
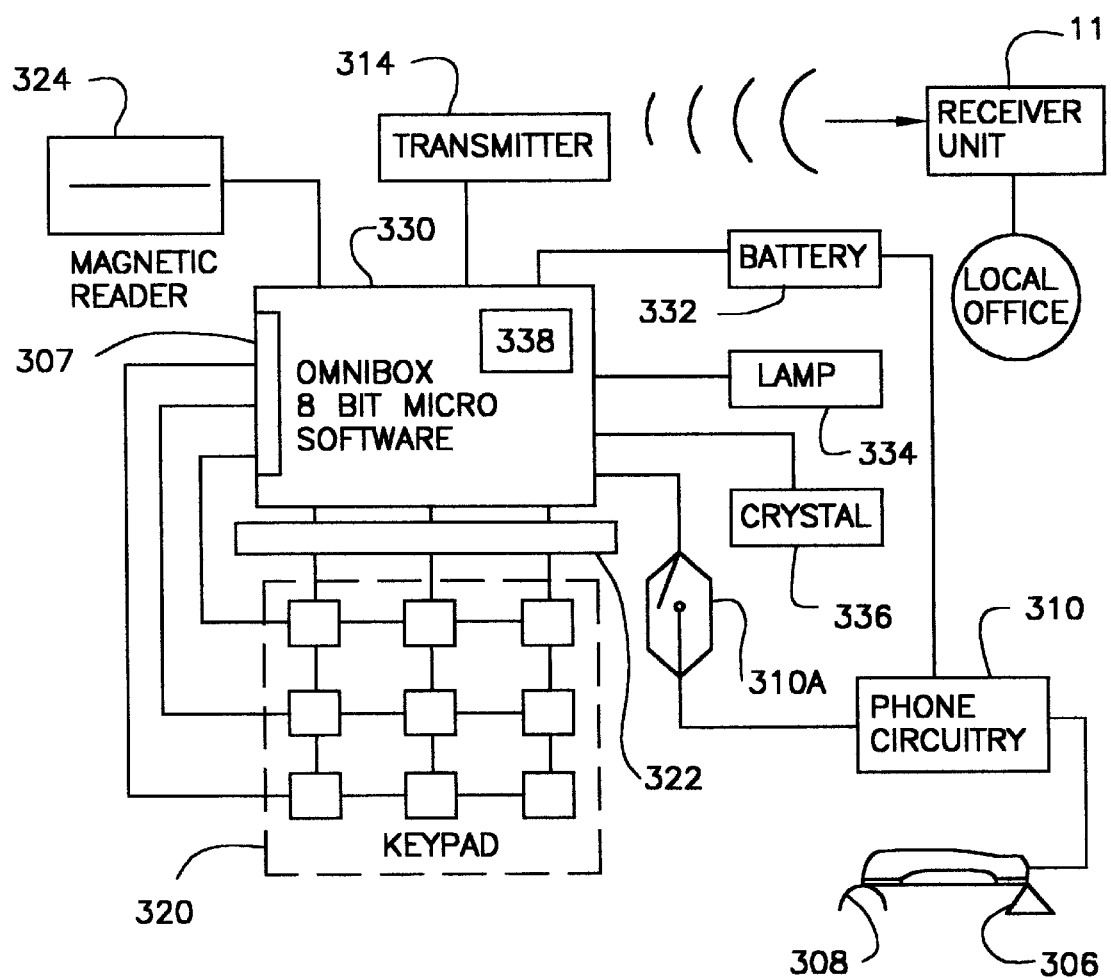
FIG. 12 is a block diagram of various components of the remote control device and portions of the Transactional Processing System.

Referring now to FIG. 11, there is shown a stationary remote control device 400, which can be mounted on an end table, or other table such as adjacent to a sofa, for controlling function of the receiver unit 11. This device 400 interacts with the receiver unit 11, and includes a split qwerty/keyboard 404 which includes function keys F1 through F12. Half of the keyboard 404a comprises a lower portion which is pivotally mounted to the upper half keyboard section 404b. Additionally, in one aspect of the invention, this embodiment of the remote control device 400 can include most components of the transactional processing system receiver unit so that it doubles as a receiver unit itself, with full computing functions such as provided with a qwerty keyboard 404.

The remote control device of the present invention is advantageous because it now allows control over the receiver unit of the transaction processing system from a remote location. Additionally, a user sitting in his home can relax and not only use a telephone, but also at his option, input financial information and communicate with the receiver unit for selecting various transactions while maintaining the same device.

It should be understood that the foregoing description of the invention is intended merely to be illustrative thereof, and that other embodiments, modifications and equivalents may be apparent to those skilled in the art without departing from its spirit.

That which is claimed is:

1. A remote control device for use with a transactional processing system having a receiver unit that receives information from a programming source over a communication channel, said receiver unit also including means for receiving and selecting desired programming selections, said remote control device comprising:

a housing forming an enclosure;

a manually actuable keypad mounted on the housing, control means mounted in the enclosure and operatively connected to said manually actuable keypad for receiving selected input data entered manually on the keypad corresponding to said desired programming selections that are provided to said receiver unit by said programming source;

means for receiving financial information from a user of said remote control device;

transmitter means operatively connected to said control means for:

a) transmitting desired programming selections to said receiver unit corresponding to a selected keypad sequence so as to choose a desired programming and interact therewith through the manually actuable keypad, b) transmitting the financial information to the receiver unit, said receiver unit transmitting said financial information on a selected communication channel to authorize a desired transaction corresponding to a desired programming selection.

2. The device according to claim 1 including means for transmitting the financial information on a communication channel different from the communication channel used to transmit desired programming selections.

3. The device according to claim 1 where in said device further comprises the hand set of a phone, wherein phone numbers are dialed from the keypad of said device, and including means for respectively transmitting and receiving data to and from the receiver unit positioned at the remote location.

4. The device according to claim 3 wherein said device includes switch means for switching between use of the device as a phone handset and use of the device as a controller for interaction with the interactive receiver unit positioned at the remote location.

5. The device according to claim 1 wherein said means for receiving financial information of said user includes a slot for wiping a card containing the financial information of the user.

6. The device according to claim 5 wherein said slot comprises a magnetic-strip/IC reader.

7. The device according to claim 1 wherein said keypad comprises a qwerty keypad.

8. The device according to claim 1 wherein said housing is configured to be held in one hand.

9. A device according to claim 1 wherein said transmitting means comprises means for interacting with a video game.

10. A device according to claim 1 wherein said receiver unit is positioned within a television set.

11. A remote control device for use with a transactional processing system having a receiver unit that receives identical transaction information sets broadcast in subchannels from a programming transmitter and then selects, stores and displays a desired information set, comprising:

a housing, a manually actuable keypad positioned on an outer surface of the housing, control means contained within the housing and operatively connected to said manually actuable keypad for receiving data entered manually on the keypad corresponding to desired programming selections in the receiver unit that receives identical transaction information sets, means for storing financial information of the user, means mounted by the housing for inputting said financial information to the financial storing means, transmitter means operatively connected to said control means for a) transmitting desired programming selections to a receiver unit corresponding to the selected keypad sequence so as to choose a desired programming and interact with the receiver unit through the manually actuable keypad, and b) transmitting any financial information of the user to the receiver unit to authorize a desired transaction in real time, phone circuitry including speaker and microphone means, and phone receiver and phone transmitter means for transmitting and receiving phone signals to and from said receiver unit, and switch means for actuating said remote control device between 1) a phone wherein said phone circuitry is activated, and 2) a device for selectively interacting with said receiver unit to choose desired programming and authorize transactions.

12. The remote control device according to claim 11 wherein said keypad includes means for activating a scrolling function within the receiver unit for scrolling through individual transaction information sets.

13. The remote control device according to claim 11 wherein said means for inputting financial information of said user includes a slot for wiping a card containing the financial information of the user.

14. The remote control device according to claim 13 wherein said slot comprises a magnetic-strip/IC reader.

15. The remote control device according to claim 11 wherein said financial information storage means includes long term storage means for storing financial information of the user for subsequent transactions.

16. The remote control device according to claim 15 wherein said long term storage means comprises an EEPROM.

17. The remote control device according to claim 11 wherein said keypad comprises a qwerty keypad.

18. The remote control device according to claim 11 including another switch means for switching between keypad selection of normal television channels and keypad selection of subchannels of the transaction information sets.

19. The remote control device according to claim 11 wherein said housing is configured to be held in one hand.

20. A remote control device according to claim 11 including means for interacting with a video game.

21. A remote control device for use with a transactional processing system having a receiver unit that receives identical transaction information sets broadcast in subchannels from a programming transmitter and then selects, stores and displays a desired information set, said receiver unit also including means for receiving and selecting desired television channels, comprising:

a closed housing which is configured to be held in one hand, a manually actuable keypad positioned on an outer surface of the housing, control means contained within the housing operatively connected to said manually actuable keypad for receiving data entered manually on the keypad corresponding to desired programming selections in the receiver unit, means for storing financial information of the user, and including means positioned on the housing for inputting said financial information to the storing means, transmitter means operatively connected to said control means for a) transmitting desired programming selections to the receiver unit on a first communication channel corresponding to the selected keypad sequence so as to choose i) desired programming of transaction information sets and ii) selected television channels, and b) transmitting the financial information of the user to a receiver unit on a second communication channel to authorize a desired transaction in real time, and switch means for actuating said remote control device between 1) a television controller for selecting television channels, and 2) a controller for interacting with said receiver unit for selecting subchannels and transmitting financial information to said receiver unit.

22. A remote control device according to claim 21 including means for interacting with a video game.

23. A remote control device for selectively controlling interaction with a receiver unit of a transactional processing system used for purchasing products and services from a plurality of available products and services, wherein said receiver unit includes means for receiving identical transaction information sets broadcast in subchannels from a programming transmitter, and including means for selecting, storing and then displaying a desired information set from the information sets received within the receiver unit and to select a desired transaction, said receiver unit including means for receiving programming selection and financial information signals from a remote control device, said remote control device comprising:

a manually actuable keypad, control means operatively connected to said manually actuable keypad for receiving selected data entered manually on the keypad corresponding to desired programming selections in the receiver unit, means for storing financial information of the user, and transmitter means operatively connected to said control means for a) transmitting the desired programming selections to said receiver unit corresponding to a selected keypad sequence so as to choose the desired programming and interact therewith through the manually actuable keypad, and b) transmitting the financial information of the user to the receiver unit through a second communication channel to authorize a desired transaction in real time.

24. The remote control device according to claim 23 wherein said keypad includes means for activating a scrolling function within the receiver unit for scrolling through individual transaction information sets.

25. The remote control device according to claim 23 wherein said means for storing financial information of said user includes a slot for wiping a card containing the financial information of the user.

26. The remote control device according to claim 25 wherein said slot comprises a magnetic-strip/IC reader.

27. The remote control device according to claim 23 wherein said storing means includes long term storing means for storing financial information of the user for subsequent transactions.

28. The remote control device according to claim 27 wherein said long term storage means comprises an EEPROM.

29. The remote control device according to claim 23 wherein said keypad comprises a qwerty keypad.

30. The remote control device according to claim 23 wherein said receiver unit includes means connecting to a local phone line, and wherein said remote control device comprises the hand set of a phone, wherein phone numbers are dialed from the keypad of said device, and including means for transmitting and receiving the phone number between the remote control device and the receiver unit.

31. The remote control device according to claim 30 wherein said remote control device includes switch means for switching between use as a phone handset and use as a controller for interaction with the receiver unit.

32. The remote control device according to claim 23 wherein said device includes means for selecting normal television channels, and including switch means for switching between keypad selection of television channels and keypad selection of subchannels of the transaction information sets.

33. A transactional processing system for purchasing products and services from a plurality of available products and services and processing corresponding financial transactions in real-time comprising:

a programming transmitter means for broadcasting and updating a plurality of transaction information sets associated with said plurality of available products and services via a first communication channel, said first communication channel having a plurality of subchannels, said subchannels each transmitting a corresponding transaction information set in said first communication channel;

a receiver unit serving a user for simultaneously receiving identical transaction information sets broadcast in subchannels from the programming transmitter means, and including means for selecting, storing and then displaying a desired information set from the broadcast information sets simultaneously received within the receiver unit and to select a desired transaction, said receiver unit including means for receiving programming selection and financial information signals from a remote control device, means forming a second communication channel originating at the receiver unit and through which financial information of the user is transmitted to a desired destination so as to authorize the desired transaction in real time for the selected products and services, and wherein said remote control device comprising,
a manually actuable keypad,
control means operatively connected to said manually actuable keypad for receiving data entered manually on the keypad corresponding to desired programming selections in the receiver unit,
means for storing financial information of the user, and
transmitter means operatively connected to said control means for
a) transmitting the desired programming selections to the receiver unit corresponding to a selected keypad sequence so as to choose the desired programming and interact with the receiver unit, and
b) transmitting the financial information of the user to the receiver unit to authorize a desired transaction in real time.

34. The system according to claim 33 wherein said keypad includes means for activating a scrolling function within the receiver unit for scrolling through individual transaction information sets.

35. The system according to claim 33 wherein said means for storing financial information of said user includes a slot for wiping a card containing the financial information of the user.

36. The system according to claim 35 wherein said slot comprises a magnetic-strip/IC reader.

37. The system according to claim 33 wherein said storage means includes long term storing means for storing financial information of the user for subsequent transactions.

38. The system according to claim 37 wherein said long term storage means comprises an EEPROM.

39. The system according to claim 33 wherein said keypad comprises a qwerty keypad.

40. The system according to claim 33 wherein said receiver unit includes means connecting to a phone line of the central office, and wherein said remote control device comprises the handset of a phone, wherein phone numbers are dialed from the keypad of said remote control device, said remote control device including means for transmitting and receiving phone messages and data between the remote control device and the receiver unit.

41. The system according to claim 40 wherein said remote control device includes switching means for switching between use as a phone handset and use as a controller for interaction with the receiver unit.

42. The system according to claim 33 wherein said receiver unit includes means for selecting normal television channels and said remote control device includes switch means for switching between keypad selection of television channels and keypad selection of subchannels of the transaction information sets.

43. The system according to claim 33 wherein said transaction information sets further comprises a plurality of prompting data corresponding to a product or service for prompting users to make a selection.

44. The system according to claim 43 wherein said set of transaction information sets further comprises:
a plurality of graphic information corresponding to the desired product or service.

45. The system according to claim 33 wherein said first communication channel comprises:
a satellite uplink/downlink transmission between said programming transmitter and one operator means for receiving and transmitting information; and a broadcast channel from said operator means to said receiver unit.

46. The system according to claim 33 wherein said second communication channel is a phone line.

47. The system according to claim 33 further comprising means for transmitting an authorizing signal to a financial institution, said financial institution making payments to vendors or service providers.

48. The system according to claim 44 wherein said receiver unit is connected to a television set, said graphic information and said prompting data being displayed on said television set.

49. A transactional processing system according to claim 33 wherein said programming transmitter means includes RAM for storing information for transmission.

50. A remote control device for use with a transactional processing system having a receiver unit that receives information from a programming source over a communication channel, said receiver unit also including means for receiving and selecting desired programming selections, said remote control device comprising:
   a housing forming an enclosure;
   a manually actuable keypad mounted on the housing,
   control means mounted in the enclosure and operatively connected to said manually actuable keypad for receiving selected input data entered manually on the keypad corresponding to said desired programming selections that are provided to said receiver unit by said programming source;
   means for storing financial information from a user of said remote control device; and
   transmitter means operatively connected to said control means for:
      a) transmitting desired programming selection to said receiver unit corresponding to a selected keypad sequence so as to choose a desired programming and interact therewith through the manually actuable keypad, and
      b) transmitting the financial information to the receiver unit, said receiver unit transmitting said financial information on a selected communication channel to authorize a desired transaction corresponding to a desired programming selection.

51. A remote control device for use with a transactional processing system having a receiver unit that receives information from a programming source over a communication channel, said receiver unit also including means for receiving and selecting desired programming selections, said remote control device comprising:
   a housing forming an enclosure;
   a manually actuable keypad mounted on the housing,
   control means mounted in the enclosure and operatively connected to said manually actuable keypad for receiving selected input data entered manually on the keypad corresponding to said desired programming selections that are provided to said receiver unit by said programming source;
   means for inserting financial information from a user of said remote control device;
   means for storing financial information of the user; and
   transmitter means operatively connected to said control means for:
      a) transmitting desired programming selections to said receiver unit corresponding to a selected keypad sequence so as to choose a desired programming and interact therewith through the manually actuable keypad, and
      b) transmitting the financial information to the receiver unit, said receiver unit transmitting said financial information on a selected communication channel to authorize a desired transaction corresponding to a desired programming selection.

52. A remote control device for use with a transactional processing system having a receiver unit that receives information from a programming source over a communication channel, said receiver unit also including means for receiving and selecting desired programming selections, said remote control device comprising:
   a housing forming an enclosure;
   a manually actuable keypad mounted on the housing,
   control means mounted in the enclosure and operatively connected to said manually actuable keypad for receiving selected input data entered manually on the keypad corresponding to said desired programming selections that are provided to said receiver unit by said programming source;
   input device which allows financial information from a user of said remote control device to be retrieved;
   means for storing financial information of the user; and
   transmitter means operatively connected to said control means for:
      a) transmitting desired programming selections to said receiver unit corresponding to a selected keypad sequence so as to choose a desired programming and interact therewith through the manually actuable keypad, and
      b) transmitting the financial information to the receiver unit, said receiver unit transmitting said financial information on a selected communication channel to authorize a desired transaction corresponding to a desired programming selection.

53. The remote control device of claim 52, wherein said input device is a slot for wiping a card containing the financial information of the user.

54. In a cable system, a remote control device for use with a transactional processing system having a receiving unit that receives information from a programming source over a communication channel, said receiver unit also including means for receiving and selecting desired programming selections, said remote control device comprising:
   a housing forming an enclosure;
   a manually actuable keypad mounted on the housing;
   control means mounted in the enclosure and operatively connected to said manually actuable keypad for receiving selected input data entered manually on the keypad corresponding to said desired programming selections that are provided to said receiver unit by said programming source;
   means for receiving financial information from a user of said remote control device; and
   transmitter means operatively connected to said control means for:
      a) transmitting desired programming selections to said receiver unit corresponding to a selected keypad sequence so as to choose a desired programming and interact therewith through the manually actuable keypad, and
      b) transmitting the financial information to the receiver unit, said receiver unit transmitting said financial information on a selected communication channel to authorize a desired transaction corresponding to a desired programming selection.

* * * * *

(12) EX PARTE REEXAMINATION CERTIFICATE (9666th)
United States Patent
Bush

(10) Number: US 6,246,400 C1
(45) Certificate Issued: May 17, 2013

(54) DEVICE FOR CONTROLLING REMOTE INTERACTIVE RECEIVER

(75) Inventor: Thomas A. Bush, Stamford, CT (US)

(73) Assignee: Tugaloo Lavonia GmbH, LLC, Wilmington, DE (US)

Reexamination Request:
No. 90/011,704, May 23, 2011
No. 90/012,082, Jan. 9, 2012

Reexamination Certificate for:
Patent No.: 6,246,400
Issued: Jun. 12, 2001
Appl. No.: 08/982,630
Filed: Dec. 2, 1997

Related U.S. Application Data

(63) Continuation of application No. 08/444,202, filed on May 18, 1995, now abandoned, which is a continuation-in-part of application No. 08/191,143, filed on Feb. 2, 1994, now Pat. No. 5,475,585, which is a continuation of application No. 07/591,380, filed on Oct. 1, 1990, now abandoned.

(51) Int. Cl.
*G06Q 20/00* (2006.01)
*G07F 7/08* (2006.01)
*G07F 7/00* (2006.01)
*H04N 7/173* (2006.01)

(52) U.S. Cl.
USPC .................................. 715/721; 348/E7.069

(58) Field of Classification Search
None
See application file for complete search history.

(56) References Cited

To view the complete listing of prior art documents cited during the proceedings for Reexamination Control Numbers 90/011,704 and 90/012,082, please refer to the USPTO's public Patent Application Information Retrieval (PAIR) system under the Display References tab.

*Primary Examiner* — Joshua Campbell

(57) ABSTRACT

A remote control device controls interaction of an interactive receiver unit positioned at a remote location. The remote control device has a housing and manually actuable keypad mounted on the housing. A control mechanism is mounted in the enclosure and operatively connected to the manually actuable keypad for receiving selected input data from the keypad corresponding to desired programming selections of the interactive receiver unit positioned at the remote location. Financial information is stored in the remote, and a transmitter transmits a desired program corresponding to a selected keypad sequence, and also transmits financial information of the user.

At the time of issuance and publication of this certificate, the patent remains subject to pending reexamination control number 90/012,747 filed Dec. 20, 2012. The claim content of the patent may be subsequently revised if a reexamination certificate issues from the reexamination proceeding.

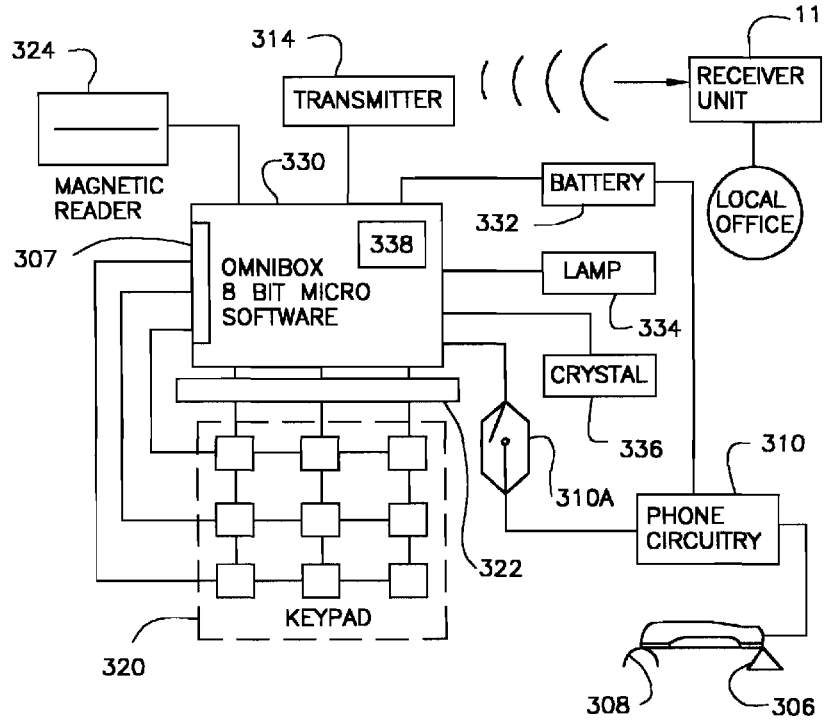

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10, 12, 17, 24 and 34 is confirmed.

Claims 1-9, 11, 13-16, 18-23, 25-33 and 35-54 are cancelled.

\* \* \* \* \*

(12) EX PARTE REEXAMINATION CERTIFICATE (9875th)
United States Patent
Bush

(10) Number: US 6,246,400 C2
(45) Certificate Issued: Oct. 15, 2013

(54) DEVICE FOR CONTROLLING REMOTE INTERACTIVE RECEIVER

(75) Inventor: Thomas A. Bush, Stamford, CT (US)

(73) Assignee: Tugaloo Lavonia GmbH, LLC, Wilmington, DE (US)

Reexamination Request:
No. 90/012,747, Dec. 20, 2012

Reexamination Certificate for:
Patent No.: 6,246,400
Issued: Jun. 12, 2001
Appl. No.: 08/982,630
Filed: Dec. 2, 1997

Reexamination Certificate C1 6,246,400 issued May 17, 2013

Related U.S. Application Data

(63) Continuation of application No. 08/444,202, filed on May 18, 1995, now abandoned, which is a continuation-in-part of application No. 08/191,143, filed on Feb. 2, 1994, now Pat. No. 5,475,585, which is a continuation of application No. 07/591,380, filed on Oct. 1, 1990, now abandoned.

(51) Int. Cl.
*G06Q 20/00* (2012.01)
*G07F 7/08* (2006.01)
*G07F 7/00* (2006.01)
*H04N 7/173* (2011.01)

(52) U.S. Cl.
USPC .................................... 715/721; 348/E7.069

(58) Field of Classification Search
None
See application file for complete search history.

(56) References Cited

To view the complete listing of prior art documents cited during the proceeding for Reexamination Control Number 90/012,747, please refer to the USPTO's public Patent Application Information Retrieval (PAIR) system under the Display References tab.

*Primary Examiner* — Joshua Campbell

(57) ABSTRACT

A remote control device controls interaction of an interactive receiver unit positioned at a remote location. The remote control device has a housing and manually actuable keypad mounted on the housing. A control mechanism is mounted in the enclosure and operatively connected to the manually actuable keypad for receiving selected input data from the keypad corresponding to desired programming selections of the interactive receiver unit positioned at the remote location. Financial information is stored in the remote, and a transmitter transmits a desired program corresponding to a selected keypad sequence, and also transmits financial information of the user.

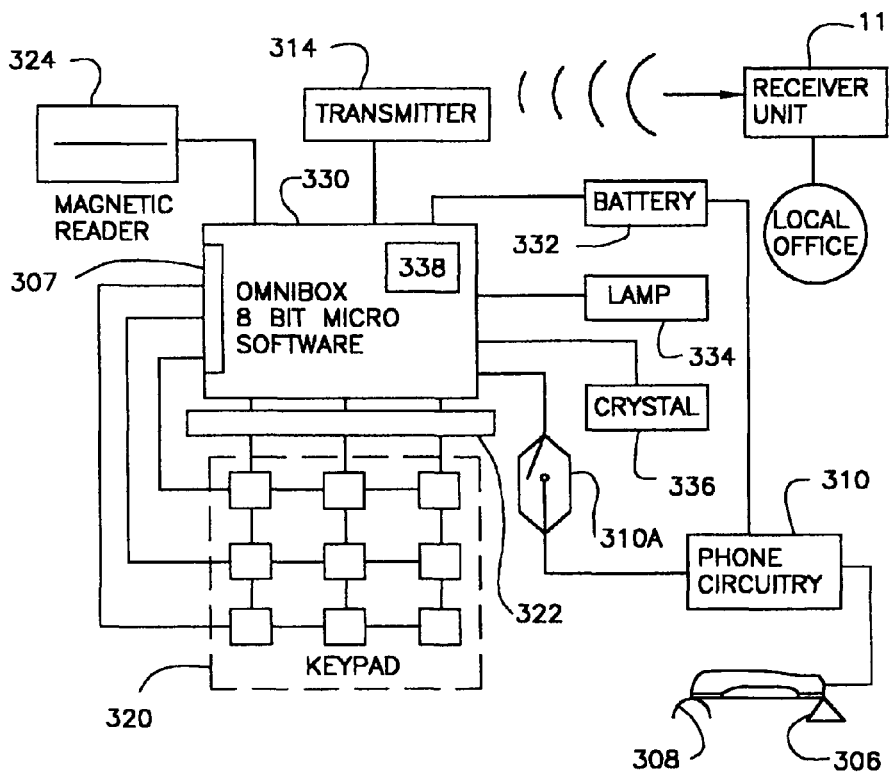

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9, 11, 13-16, 18-23, 25-33 and 35-54 were previously cancelled.

Claims 10, 12, 24 and 34 are cancelled.

Claim 17 was not reexamined.

* * * * *